United States Patent Office 3,444,387
Patented May 13, 1969

3,444,387
AUTOMATIC PARALLELING SYSTEM
William W. Billings and Wendell Calfee, Lima, Ohio, assignors to Westinghouse Electric Corporation, Pittsburgh, Pa., a corporation of Pennsylvania
Filed June 20, 1967, Ser. No. 647,446
Int. Cl. H02j 1/00, 3/38
U.S. Cl. 307—87                                                8 Claims

ABSTRACT OF THE DISCLOSURE

A static automatic paralleling system for controlling the connection of an alternating current generator to an energized line for operation in parallel with other generators. Superposed half-wave voltages of the generator and the line are applied to a phase difference sensing circuit which provides signals to a frequency difference sensing circuit to obtain a final output signal when the phase difference and frequency difference between the generator and line are within predetermined limits. The final output signal controls the generator circuit breaker.

---

Figure 1:
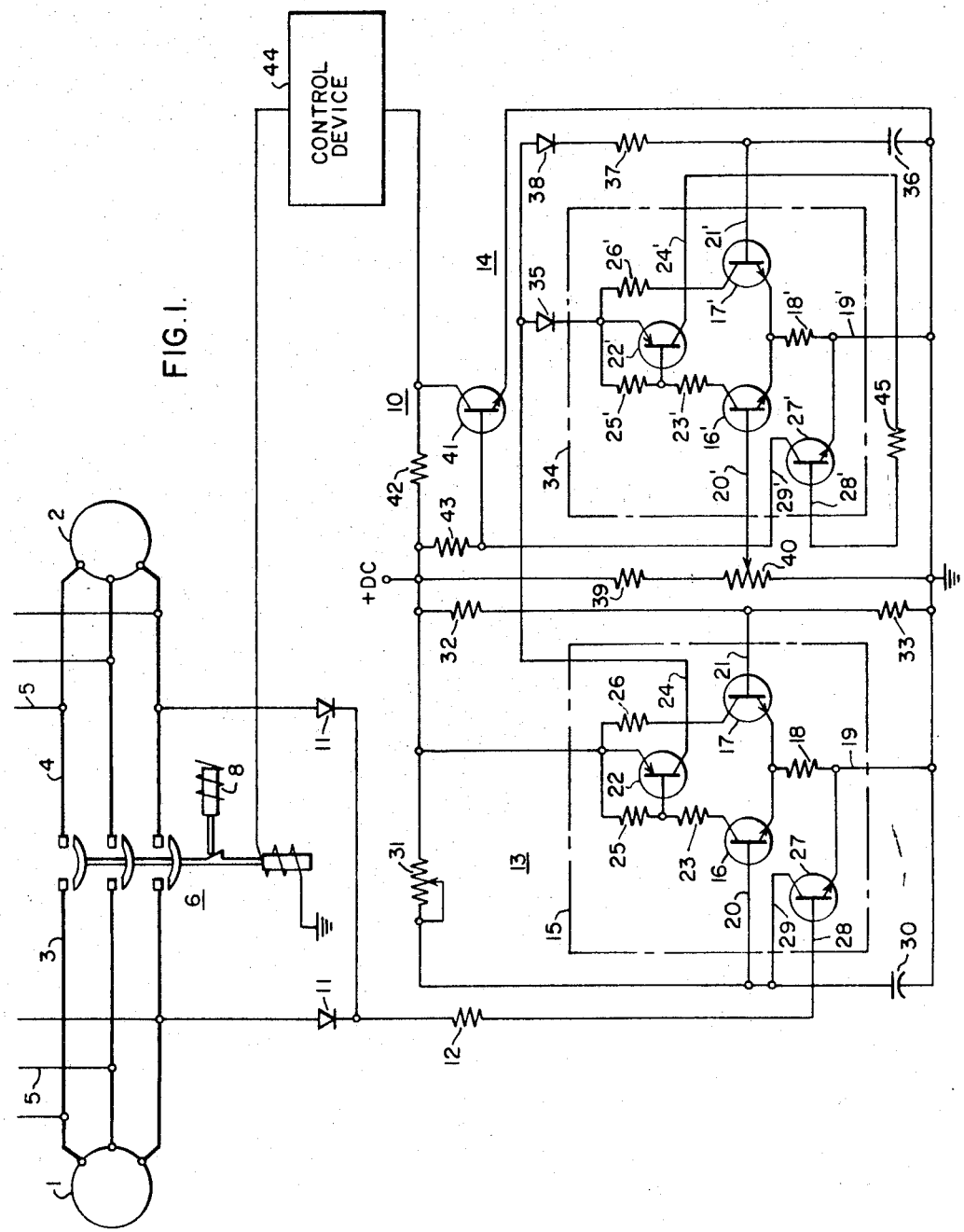

The present invention relates to automatic paralleling of alternating current generators, and more particularly to an improved system for controlling the connection of an alternating current generator to an energized line or bus for operation in parallel with one or more other generators.

When an alternating current generator is to be operated in parallel with one or more other generators, the generators must be close to synchronism with each other when they are connected together, or when the incoming generator is connected to a line or bus to which the other generators are already connected. This means that the voltage, frequency and phase angle of the incoming generator and of the line must be close to the same values, within predetermined limits, in order to prevent excessive system transients, and so that the incoming generator will pull into synchronism with the line and operate properly in parallel with the other generators.

When the generators are provided with control means or regulators which hold the frequency and voltage of the generators close to the desired values, paralleling can be accomplished by providing sensing means for sensing the frequency and phase angle differences between the generator and the line. The output of the sensing means then controls the circuit breaker of the incoming generator to cause the breaker to close at the correct instant when the incoming generator is sufficiently close to synchronism with the line.

Static sensing means are preferably used for this purpose in applications such as in aircraft electrical systems, because of their high reliability under adverse environmental conditions and because they can be made quite small and light in weight. In the static automatic paralleling circuits that have been used heretofore the phase angle difference and the frequency difference, or slip frequency, between the incoming generator and the line have usually been sensed separately. A transformer was connected between corresponding phases of the generator and the line to obtain a modulated voltage proportional to the phase difference. This voltage was rectified and filtered to obtain a direct current voltage the magnitude of which represented the phase difference. Slip frequency sensing was accomplished by obtaining a similar modulated voltage having a frequency equal to the difference between the frequencies of the incoming generator and the line. This modulated voltage was also rectified and filtered to obtain a pulsating direct current voltage which was utilized to indicate the slip frequency.

These prior automatic paralleling systems have been used extensively and successfully, but they are not well adapted to miniaturization. There is an increasing demand for reduction in size and weight of aircraft and aerospace control equipment but the prior types of automatic paralleling circuits require transformers and filter capacitors which are necessarily relatively large and bulky, so that these types of circuits cannot be substantially reduced in size and weight. The prior systems also have other disadvantages such as high power dissipation, the use of sensing elements such as Zener diodes which are sensitive to temperature variations, and sensitivity to variation in the generator voltages.

The principal object of the present invention is to provide a small lightweight automatic paralleling system which requires no transformers or filter capacitors, so that it can readily be miniaturized by the use of small solid state components or integrated circuits, but which is highly accurate and reliable and is not affected by changes in temperature or generator voltage.

Briefly, in accordance with the present invention, corresponding phase voltages of two generators, or of an incoming generator and a line, are half-wave rectified and the half-wave voltages of the same polarity are superposed to provide an input voltage to the automatic paralleling system itself. Since half-wave voltages of the same polarity are thus superposed, the periods of zero voltage between successive waves will vary in duration with the phase difference between the two voltages and this is used as an indication of the phase difference.

The automatic paralleling system includes a phase difference sensing circuit in which the input voltage charges a capacitor and the time of the zero voltage periods is measured by comparing the voltage of the capacitor with a reference voltage to produce a train of output pulses when the phase difference is within the desired limits. The output pulses from the phase difference sensing circuit are applied to a slip frequency sensing circuit and utilized to charge a second capacitor in such a manner that the capacitor voltage indicates the slip frequency. When the correct slip frequency appears during the occurrence of a voltage pulse from the phase difference sensing circuit, a final output signal is obtained which is utilized to effect closing of the generator circuit breaker to connect the incoming generator to the line. In this way, an automatic paralleling system is provided which lends itself to miniaturization since no transformers or filter capacitors are required and integrated circuits or other miniature components can be used.

Figure 2:
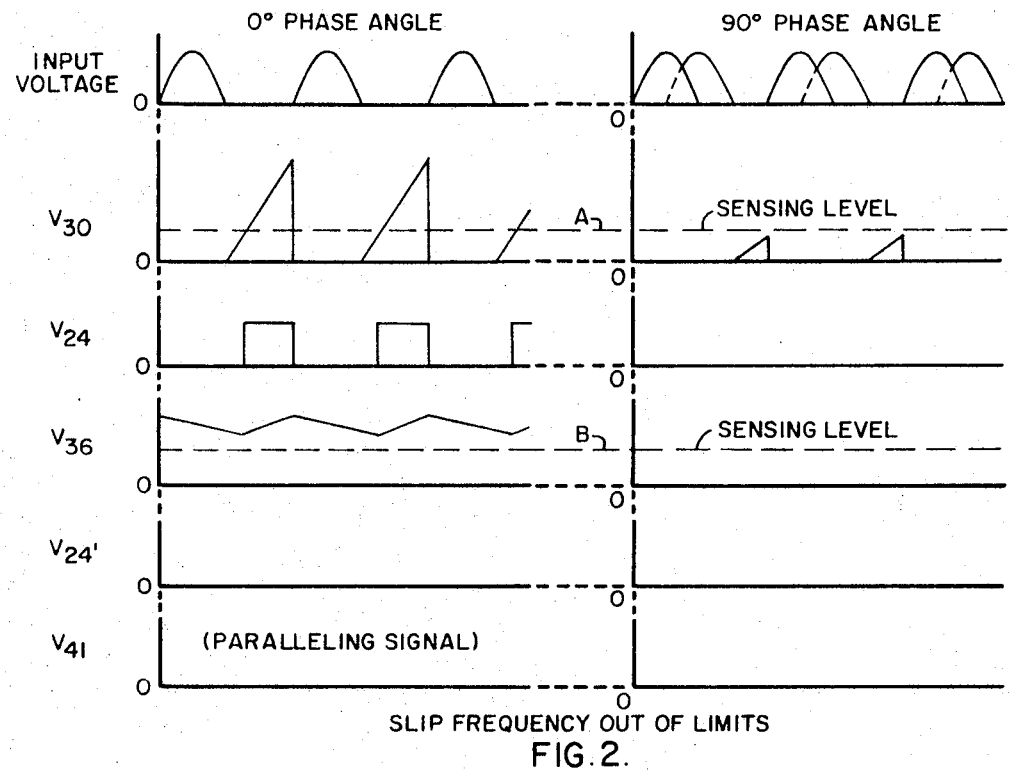
Figure 3:
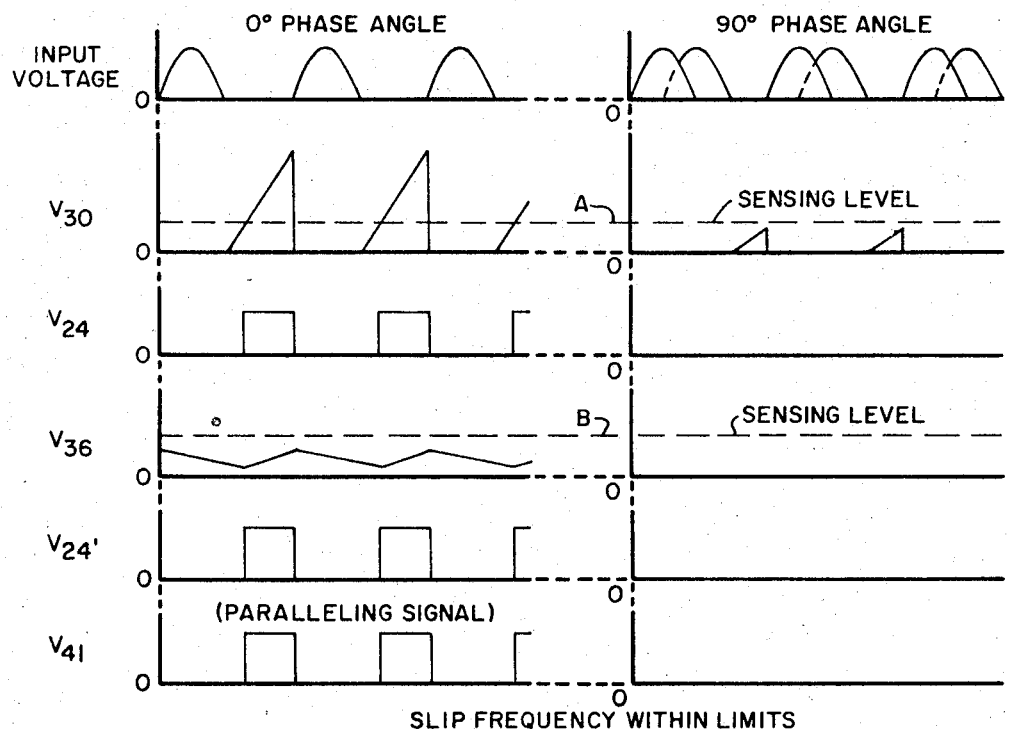

The invention will be more fully understood from the following detailed description, taken in connection with the accompanying drawings, in which:

FIGURE 1 is a circuit diagram showing a preferred embodiment of the invention; and FIGS. 2 and 3 are diagrams showing certain voltages at various points in the circuit of FIG. 1 under conditions of high slip frequency and low slip frequency, respectively.

A preferred embodiment of the invention is illustrated in FIG. 1 in a system for controlling the paralleling of two alternating current generators 1 and 2. The generators 1 and 2 may be of any desired type and are shown as three-phase generators connected to three-phase lines or buses 3 and 4 for supplying load buses 5. The generators are connected together for parallel operation by means of a circuit breaker 6 which connects the buses 3 and 4 together. The circuit breaker 6 may be any suitable type of breaker and is shown as having a closing coil 7 which is controlled automatically, as hereinafter described, and which may also be provided with any desired additional means for automatic or manual operation. The breaker 6 also has a trip coil 8 which may be controlled manually or automatically in any desired manner.

It will be understood that, as is usual in systems of this kind, the generators 1 and 2 are provided with voltage regulators (not shown) of any suitable or usual type which maintain the generator voltages sufficiently close to a desired value to permit paralleling. The system thus far described is to be taken as representing any system in which an alternating current generator is to be connected for operation in parallel with one or more other generators, and the circuit breaker 6 represents any suitable switching means for connecting an incoming generator to an energized line or generator.

As previously discussed, the circuit breaker 6 must be controlled so that it closes only when the incoming generator is close enough to synchronism with the line to permit paralleling. The breaker therefore must be controlled so that it can close only when the frequencies and phase angles of the incoming generator and of the line are close enough to enable the generator to pull into synchronism without excessive system transients.

For this purpose, a static automatic paralleling system generally designated 10 is provided. An input voltage to which the automatic paralleling system 10 responds is obtained by connecting diodes 11 to corresponding phases of the two generators, or of the incoming generator and the line. The diodes 11 provide half-wave rectified voltages of the same polarity and are connected together as shown to superpose the two voltages. The diodes are connected through a dropping resistor 12 to apply the superposed voltages as an input voltage to the automatic paralleling circuit 10.

Since the superposed voltages are half-wave rectified voltages of the same polarity, they will coincide in position if the two generators are exactly in phase and the input voltage will appear as shown at the left of FIGS. 2 and 3, with zero voltage periods between successive waves equal to the length of the waves. If the voltages were exactly 180° out of phase, the input voltage would appear as a full-wave rectified voltage with no zero voltage periods between the waves. For phase angles between 0° and 180°, the duration of the zero voltage period will decrease with increasing phase angles, voltage waves having a phase angle of 90° being illustrated at the right of FIGS. 2 and 3. Thus the duration of the zero voltage time between successive voltage waves varies from a full half-cycle to zero and is inversely proportional to the phase angle between the generators. This zero voltage time is utilized in the automatic paralleling system to sense the phase angle between generators, by comparing a voltage proportional to the zero voltage periods with a fixed reference voltage in a phase difference sensing circuit.

The automatic paralleling system 10 includes the phase difference sensing circuit 13 and a slip frequency sensing circuit 14. The phase difference sensing circuit 13 includes a voltage detecting circuit 15 which may be of any suitable type but which is shown as a known type of voltage comparison circuit or differential amplifier. Circuits of this type are available as integrated circuits, permitting extreme miniaturization of the complete system, and such circuits are preferably used although the invention is not limited to the use of integrated circuits as the voltage detecting circuit may be made up of conventional discrete components if desired.

As shown, the voltage detecting circuit 15 includes two transistors 16 and 17 of the same type, shown as NPN transistors, with their emitters connected to a common emitter resistor 18 for connection to ground through a terminal 19. The bases of the transistors 16 and 17 are connected to terminals 20 and 21, respectively, for connection to the voltages which are to be compared. A third transistor 22 of complementary type (PNP in the illustrated embodiment) is provided in an amplifying arrangement with its base connected to the collector of transistor 16 through a resistor 23. The collector of transistor 22 is connected to an output terminal 24 and the emitter is connected to a suitable source of direct current supply. A resistor 25 is connected between the base and emitter of transistor 22 as shown. The collector of transistor 17 is also connected to the direct current supply through a resistor 26.

If a voltage is applied to the terminal 21, the transistor 17 is made conductive so that current flows in its collector-emitter circuit and a sufficient voltage is developed across the resistor 18 to reverse bias the emitter-base junction of the transistor 16 to make it non-conductive. If a voltage is applied to the terminal 20 which is less than the voltage at the terminal 21, the reverse biasing of transistor 16 will prevent conduction. If the voltage at the terminal 20 exceeds the voltage at terminal 21, however, the base drive of transistor 16 exceeds that of transistor 17 and transistor 16 becomes conductive, resulting in reverse biasing transistor 17 so that it is turned off and becomes non-conductive. When transistor 16 conducts, base drive is applied to transistor 22, turning it on, and an output voltage appears at the terminal 24. Thus the circuit 15 functions as a sensitive voltage comparison circuit which provides an output voltage whenever the voltage applied to terminal 20 exceeds the voltage at terminal 21.

An input transistor 27 is provided which may be included as part of the integrated circuit 15. In the illustrated embodiment, the transistor 27 is shown as an NPN transistor since the input voltage to the system utilizes the positive half-waves of the generator voltages. The emitter of the transistor 27 is connected to the ground terminal 19 while the base is connected to an input terminal 28 and the collector is connected to a terminal 29.

The duration of the zero voltage periods of the input voltage to the automatic paralleling system is measured by means of a capacitor 30 which is charged at a constant rate from the direct current supply through an adjustable resistor 31. The capacitor 30 is connected to the terminal 20 of the voltage detecting circuit 15 to apply the capacitor voltage to the base of transistor 16, and a reference voltage is applied to the terminal 21. The reference voltage is a fixed voltage obtained from the direct current supply by means of a voltage divider consisting of resistors 32 and 33. Charging of the capacitor 30 during the zero voltage periods is controlled by the input voltage. The input voltage from the diodes 11 is connected to the terminal 28 to be applied to the base of the transistor 27, and terminal 29 is connected to the capacitor 30 so that transistor 27 is connected across the capacitor. During periods when the input voltage is greater than zero, the transistor 27 conducts and discharges the capacitor. When the input voltage is zero, transistor 27 ceases to conduct and the capacitor 30 charges at a constant rate so that the capacitor voltage is proportional to the duration of the zero voltage period.

Output voltage pulses appear at the terminal 24 whenever the voltage of capacitor 30 exceeds the reference voltage. These pulses are applied to the slip frequency sensing circuit 14. The slip frequency sensing circuit includes a voltage detecting circuit 34 which may be a voltage comparison circuit identical to the circuit 15, and corresponding elements of the circuit 34 are designated by primed reference numerals. The voltage detecting circuit 34 is energized by the voltage pulses from terminal 24, through a blocking diode 35, so that the circuit is energized only during the occurrence of an output voltage from the circuit 15. A capacitor 36 is also provided in the slip frequency sensing circuit 14. The capacitor 36 is charged by the output voltage pulses of the circuit 15 and is connected to the output terminal 24 through a resistor 37 and a blocking diode 38. In this instance, an output signal from the circuit 34 is desired when the capacitor voltage is less than a predetermined value, for reasons explained hereinafter, and the capacitor 36 is therefore connected to the terminal 21' of the voltage detecting circuit 34 to apply the capacitor voltage to the base of transistor 17'. An adjustable reference voltage is provided from the direct current supply by means of a voltage divider consisting of a resistor 39 and an adjustable resistor 40 which is connected to terminal 20' to apply the reference voltage to the base of transistor 16'.

The output terminal 24' of the circuit 34 is connected to the terminal 28' through a current limiting resistor 45 to apply the output signal to the base of transistor 27', and the collector of transistors 27' is connected through terminal 29' to the base of an output transistor 41 from which the final output signal is obtained. The collector of transistor 41 is connected to the direct current supply through a resistor 42 and the emitter is connected to ground. A bias resistor 43 is connected across the base and collector of transistor 41. The final output signal of the automatic paralleling system 10 thus appears at the collector of transistor 41, and the collector is connected to control device 44 which may be of any suitable type to control the closing coil 7 of the circuit breaker 6. The control device 44 may for example include solid state amplifying means, and may include any other desired control circuitry for the circuit breaker 6. If sufficient energy is available at the collector of transistor 41 it could of course be connected directly to the closing coil 7 of the circuit breaker 6.

The operation of the automatic paralleling system 10 may be described by reference to FIGS. 2 and 3. As previously explained, and as illustrated in FIGS. 2 and 3, the zero voltage periods of the superposed input voltages are inversely proportional to the phase angle between the incoming generator and the line, and the phase difference sensing circuit 13 responds to the duration of the zero voltage periods to provide an output whenever the voltages of the incoming generator and the line are within the desired phase angle difference.

During the periods when the input voltage is greater than zero the transistor 27 is conductive and the capacitor 30 is essentially short-circuited so that it discharges and has zero voltage. When the input voltage falls to zero, the transistor 27 ceases to conduct and the capacitor 30 charges at a constant rate from the direct current supply through the adjustable resistor 31, as shown by the voltage $V_{30}$ in FIGS. 2 and 3. The voltage of the capacitor 30 is thus a measure of the duration of the zero voltage periods of the input voltage, and the capacitor voltage is applied to the base of transistor 16, as previously described, for comparison with the fixed reference voltage applied to transistor 17. The reference voltage establishes a fixed sensing level, designated A in FIGS. 2 and 3 and whenever the capacitor voltage exceeds this level an output voltage $V_{24}$ appears at terminal 24 of the voltage comparison circuit 15. A train of voltage pulses will therefore appear at the output terminal 24, as shown at the left of FIGS. 2 and 3, when the phase angle between the generator and line is within the limit corresponding to the sensing level A. When the phase difference exceeds this limit, no output pulses appear at the terminal 24 as shown at the right of FIGS. 2 and 3. Thus, the occurrence of a train of voltage pulses at the terminal 24 indicates that the voltage of the generator and line are within the desired phase angle difference.

The voltage pulses from the terminal 24 are applied to the capacitor 36 in the slip frequency sensing circuit 14 to charge this capacitor. It will be appreciated that if the frequencies of the incoming generator and of the line are not the same, the superposed voltages will pass through coincidence and pull apart repetitively, and the speed with which this occurs will depend on the frequency difference, or slip frequency. While the two voltages are passing through synchronism a train of voltage pulses will appear at the terminal 24, at substantially the system frequency, but as the voltages pull apart, the train of voltage pulses will be interrupted when the phase difference exceeds the limit established by the reference voltage A in the phase difference sensing circuit 13. Thus, if the slip frequency is relatively high, the successive trains of pulses will follow each other relatively rapidly, while if the slip frequency is low the interruptions will be of greater length. Since the capacitor 36 is charged by these voltage pulses, the capacitor voltage will build up to a relatively high value at the high slip frequencies while at low slip frequencies the capacitor voltage will be lower, as illustrated by the voltage $V_{36}$ at the left of FIG. 2 for high slip frequencies, and at the left of FIG. 3 for low slip frequencies.

The voltage of the capacitor 36 therefore may be taken as an indication of the slip frequency and is compared with a reference voltage in the voltage comparison circuit 34, as previously explained. The reference voltage is adjustable by means of the resistor 40 and is applied to the terminal 20' to establish a sensing level designated B in FIGS. 2 and 3. When the voltage of capacitor 36 is above this limit as in FIG. 2, the slip frequency is too high for paralleling, while if the capacitor voltage is below the sensing level as illustrated in FIG. 3, the slip frequency is within the desired limit. The voltage comparison circuit 34 compares the capacitor voltage $V_{36}$ to the reference voltage in the manner previously described and when the capacitor voltage is below the reference voltage, the transistor 16' is turned on and becomes conductive. If a voltage pulse $V_{24}$ from the voltage comparison circuit 15 occurs at the same time to energize the voltage comparison circuit 34, an output voltage signal $V_{24}$, appears at the terminal 24', as shown at the left in FIG. 3. This voltage signal is applied to the base of transistor 27' to turn it on and make it conductive.

The final output transistor 41 is normally supplied with base drive from the direct current supply so that it is conductive and has substantially zero collector voltage. When the transistor 27' is turned on, however, the base drive of the transistor 41 is shunted to ground so that the transistor 41 is turned off and becomes non-conductive. An output voltage signal $V_{41}$ therefore appears at the collector of transistor 41 and is applied to the control device 44 to effect closing of the circuit breaker 6 as previously described.

Thus, to summarize the operation of the system, the superposed input voltages derived from the incoming generator and the line are applied to the phase difference sensing circuit 13 which provides a train of output voltage pulses when the input voltages are within the desired phase angle limits. The output voltage pulses from this circuit are applied to the slip frequency sensing circuit 14 and an output signal for effecting closing of the breaker 6 is obtained from the circuit 14 when the voltage of capacitor 36 indicates that the slip frequency is within the desired limit and a voltage pulse from the circuit 13 is also present, indicating that the phase angle difference is within the desired limit. The phase angle difference is set by adjustment of the resistor 31, which determines the charging rate of capacitor 30, and the slip frequency limit is set by adjustment of the resistor 40, which determines the reference voltage for the slip frequency sensing circuit. It will be noted that these adjustments are simple and easily made and are completely independent of each other.

This automatic paralleling system has many advantages. It uses only static components of small size and high reliability and is well adapted to miniaturization since it lends itself to the use of integrated circuits as previously mentioned. This results in much smaller power dissipation than previously known circuits, as well as permitting miniaturization because no bulky transformers or filter capacitors are needed. It will also be noted that no temperature sensitive devices such as Zener diodes are used for sensing purposes, so that the circuit is insensitive to temperature variations and no expensive or complicated temperature compensating means are required. The circuit is also insensitive to variations in the magnitude of the generator voltages and is readily adaptable without increase in size or loss of accuracy to use with systems of any frequency. Thus, an improved and very desirable type of automatic paralleling system has been provided.

A preferred embodiment of the invention has been shown and described for the purpose of illustration. It will be apparent, however, that the invention is capable of various other embodiments and modifications and it is to be understood that the invention in its broadest aspects is not restricted to the specific circuit arrangement shown but includes all equivalent embodiments and modifications.

We claim as our invention:

1. A system for effecting paralleling of an alternating current generator with an energized line, said system comprising means for half-wave rectifying the voltages of the generator and of the line and superposing said half-wave voltages of the same polarity, phase difference sensing means responsive to the duration of zero voltage periods of said superposed voltages for producing a train of voltage pulses when said duration is greater than the time corresponding to a predetermined phase difference between the voltages of the generator and the line, frequency difference sensing means energized by said train of voltage pulses for producing an output signal when the frequency difference between the generator and the line is less than a predetermined value, and means responsive to said output signal for effecting connection of the generator to the line.

2. A system as defined in claim 1 in which said phase difference sensing means consists of a capacitor, means for charging the capacitor at a constant rate during zero voltage periods of said superposed voltages, and voltage detecting means for producing a voltage pulse whenever the capacitor voltage exceeds a predetermined reference voltage.

3. A system as defined in claim 2 in which said voltage detecting means comprises a solid state voltage comparison circuit and includes means for discharging said capacitor when said superposed voltages are greater than zero.

4. A system as defined in claim 1 in which said frequency difference sensing means consists of a capacitor, means for applying said voltage pulses to said capacitor to charge the capacitor, and voltage detecting means for producing said output signal when the capacitor voltage is less than a predetermined reference voltage during the occurrence of a voltage pulse.

5. A system as defined in claim 4 in which said voltage detecting means is a solid state voltage comparison circuit.

6. A system for effecting paralleling of an alternating current generator with an energized line, said system comprising means for half-wave rectifying the voltages of the generator and of the line and superposing said half-wave voltages of the same polarity, phase difference sensing means including a first capacitor, means for charging said capacitor at a constant rate during zero voltage periods of the superposed voltages, first voltage detecting means for producing a voltage pulse whenever the capacitor voltage exceeds a first predetermined reference voltage, whereby a train of voltage pulses is produced when the duration of said zero voltage periods is greater than the time corresponding to a predetermined phase difference between the superposed voltages, frequency difference sensing means including a second capacitor, means for applying said voltage pulses to said second capacitor to charge the second capacitor, second voltage detecting means energized by said voltage pulses and responsive to the voltage of the second capacitor to produce an output signal when the voltage of the second capacitor is less than a second reference voltage during the occurrence of a voltage pulse, and means responsive to said output signal for effecting connection of the generator to the line.

7. A system as defined in claim 6 in which the first and second voltage detecting means are solid state voltage comparison circuits, and the first voltage detecting means includes means for discharging the first capacitor when said superposed voltages are greater than zero.

8. A system as defined in claim 6 which includes means for adjusting the charging rate of the first capacitor and means for adjusting the second reference voltage.

References Cited

UNITED STATES PATENTS

| | | | |
|---|---|---|---|
| 2,838,685 | 6/1958 | Stineman | 307—87 |
| 2,862,111 | 11/1958 | Richards et al. | 307—87 |
| 2,928,007 | 3/1960 | Pratt | 307—87 |
| 3,069,555 | 12/1962 | Kessler | 307—87 |
| 3,069,556 | 12/1962 | Apfelbeck et al. | 307—87 |
| 3,210,556 | 10/1965 | Billings | 307—87 |

ROBERT K. SCHAEFER, *Primary Examiner.*

H. J. HOHAUSER, *Assistant Examiner.*